US 6,674,325 B2

(12) United States Patent
Chen et al.

(10) Patent No.: US 6,674,325 B2
(45) Date of Patent: Jan. 6, 2004

(54) BALANCED CURRENT CONVERTER WITH MULTIPLE PULSE WIDTH MODULATED CHANNELS

(75) Inventors: An-Tung Chen, Hsinchu (TW); Yung-Peng Hwang, Hsinchu (TW)

(73) Assignee: Windbond Electronics Corporation, Hsinchu (TW)

( * ) Notice: Subject to any disclaimer, the term of this patent is extended or adjusted under 35 U.S.C. 154(b) by 0 days.

(21) Appl. No.: 10/143,986

(22) Filed: May 14, 2002

(65) Prior Publication Data

US 2003/0214354 A1 Nov. 20, 2003

(51) Int. Cl.[7] .................................................. H03F 3/38
(52) U.S. Cl. .............................. 330/124 D; 330/124 R; 330/10
(58) Field of Search .............................. 330/10, 124 R, 330/124 D, 126

(56) References Cited

U.S. PATENT DOCUMENTS 4,346,349 A * 8/1982 Yokoyama ................... 330/10
6,278,263 B1    8/2001  Walters et al.
6,285,571 B1    9/2001  Brooks et al.

* cited by examiner

Primary Examiner—Shawn Riley

(57) ABSTRACT

A balanced current converter with multiple PWM converter channels has an error amplifier, a main converter channel and at least one parallel converter channel. The converter provides a DC power output and feeds back an average output voltage signal. The error amplifier compares a reference voltage signal and the average output voltage signal to generate an error signal. The main converter channel outputs a main channel current signal and a main channel power output according to the error signal. The parallel converter channel compares the main channel current signal and the respective parallel channel current signal to generate a first deviation signal, then compares the first deviation signal and the error signal to generate a second deviation signal. The parallel converter channel provides and measures a respective parallel channel power output to feed back the respective parallel channel current signal.

19 Claims, 2 Drawing Sheets

BALANCED CURRENT CONVERTER WITH MULTIPLE PULSE WIDTH MODULATED CHANNELS

FIELD OF THE INVENTION

The present invention relates to a power converter and especially to a balanced current converter with multiple pulse width modulated channels.

BACKGROUND OF THE INVENTION

Since the power consumption of computer central processing units (CPU) is increasing, direct current (DC) converters need to supply more than 60 amps of current for computer operation. Consequently, a multi-channel structure converter provides a more economical performance than a single channel converter. Of the multi-channel converters, a smaller and cheaper filter capacitor may be chosen for the multi-channel pulse width modulated (PWM) converter having a current ripple scattering effect. Therefore, most of the parallel multi-channel converters employ the structure of the PWM converter channels.

A multi-channel converter connects in parallel a plurality of pulse width modulated channels with the same output voltage to provide a higher output current. There is often a voltage difference between the channels supplying the same load. The difference between the channels may occur in one or several channels providing a comparatively higher current. In particular, some types of converters, such as synchronous rectified converters, have the ability to sink as well as source output current. In these converters, a great current may flow from one channel to another. This phenomenon can lead to excessive power dissipation, at which point these channels bear the highest power load. Thereafter, the supplying ability of working components in every channel must be increased and the load that the converter supplies must be limited to below the combined full load capability of the individual channel. Therefore, the converter cost may increase and the life span thereof may be reduced for only a few channels working in the high temperature. A converter with the capability to share and balance the load current may be the better choice. Every channel provides the same current; that is to say, every channel bears the same load and has almost the same life span. The life span and cost problems are solved by sharing and balancing the load current.

U.S. Pat. No. 6,285,571 discloses a converter with a plurality of converter channels. In the converter, all channels measure the average output voltage thereof in front of the position of the inductor and then compare the average output voltages and adjust their PWM duty cycle to reduce the deviation average output voltages between channels. Therefore, the converter may achieve current sharing with comparison of the average output voltages of the channels. The method may reduce the deviation average output voltage of every channel but the inductance of the inductors is reduced when the power switch on-off frequency is increased. The equivalent resistance of the inductor constructed by the lower inductance is also reduced. The lower resistance causes a higher current imbalance when there is a small offset voltage between the channels. For example, an offset voltage 15 mV divided by the equivalent resistance of the inductor 3 milliohm equals a 5 amps current. Therefore, the huge current flows from the higher voltage channels into the lower voltage channels.

Another U.S. Pat. No. 6,278,263 discloses a multi-phase DC/DC converter including a plurality of converter channels. Each converter channel is configured for generating a converter channel current and for adjusting the converter channel current in response to a channel deviation current signal representative of a comparison of the channel current signal to an average current signal and an error signal representative of a comparison of the converter output voltage to a reference voltage. The average current signal is representative of an overall average current for the converter channels. Therefore, the pulse width modulator controls the duty cycle thereof to provide a sharing and balancing output current. FIG. 1 is a sketch of a multi-phase converter with balanced currents. The current sensor 110 detects the signal, $V_{1SEN1}$, the output current of the converter channel. The summing circuit 102 sums $V_{1SEN1}$, $V_{1SEN2}$, and $V_{1SEN3}$ and then, the scaling circuit 103 scales (divides by 3) the sum of $V_{1SEN1}$, $V_{1SEN2}$, and $V_{1SEN3}$ to obtain an average output current signal of the converter. Every output current signal $V_{1SEN1}$, $V_{1SEN2}$, and $V_{1SEN3}$ is compared with the average output current signal. Depicting one converter channel, the subtraction circuit 104 subtracts the average output current signal from the $V_{1SEN1}$ to obtain a bias signal. The bias signal goes through the compensation circuit 105 to filter and gain the bias signal, and then arrives at the subtraction circuit 106. The subtraction circuit 106 compares the filtered and enhanced signal with a deviation signal generated by the error amplifier (E/A) 101 and generates a modified deviation signal wherein the error amplifier 101 compares the $V_{REF}$ and the output voltage of the converter to generate the deviation signal. Therefore, the subtraction circuit 106 outputs the modified deviation signal to the pulse width modulator 107. With the ramp input and the modified deviation signal from the subtraction circuit 106, the pulse width modulator 107 controls the duty cycle of the power switch 108 to provide a pulse power output. The inductor 109 and the capacitor 112 filter the pulse power output to form a direct current output to the load 111. As in the above description, the converters sense current signals of all converter channels and then adjust every output current of the converter channels based on the bias signal compared with the average current signal and the current signal of every converter channel. There are still some problems in the converters. One is that the control circuit of the converter is too complex and another is that the average circuit must be modified if the quantity of the converter channels is changed.

According to the above description, the converter that simplifies the control circuits thereof and shares the load with the all-working channels with balanced current is needed for the multi-channel PWM converter.

SUMMARY OF THE INVENTION

The present invention provides a balanced current converter with multiple pulse width modulated channels.

The invention comprises a balanced current converter comprising a converter output, an error amplifier, a main converter channel and at least one parallel converter channel. The converter output provides a power output and an average output voltage signal. The error amplifier inputs the reference voltage signal and the average output voltage signal, and compares them to generate an error signal. The main converter channel couples within the converter output and the error amplifier and outputs the main channel current signal and the main channel power output according to the error signal. The parallel converter channel couples within the converter output and the error amplifier, and connects with the main converter channel to obtain the main channel current signal. The parallel converter channel compares the main channel current signal and the respective parallel channel current signal to generate the first deviation signal, and then the parallel converter channel compares the first deviation signal and the error signal to generate a second deviation signal. The parallel converter channel provides a respective parallel channel power output and measures the respective parallel channel power output to feed back the respective parallel channel current signal, wherein the power output includes the main channel power output and the respective parallel channel power output.

The main converter channel comprises a pulse width modulator inputting the error signal and outputting a pulse width modulated signal, a power switch inputting the pulse width modulated signal, adjusting the duty cycle thereof and then outputting a pulse power based on the pulse width modulated signal, a filter, an inductor and a capacitor for filtering the pulse power to the main channel power output, and a channel current sense circuit, a resistor and a differential amplifier for detecting the main channel power output and generating the main channel current signal. The channel current sense circuit may utilize a precision resistor or a turn-on resistor of the power switch to measure a voltage deviation between two ends of the resistor.

The parallel converter channel comprises a second subtraction circuit outputting the second deviation signal, a pulse width modulator inputting the second deviation signal and generating a pulse width modulated signal, a power switch inputting the pulse width modulated signal and outputting a pulse power, a filter, an inductor and a capacitor filtering the pulse power to the respective parallel channel power output, a first subtraction circuit inputting the main channel current signal and the respective parallel channel current signal and outputting the first deviation signal, and a channel current sense circuit, a resistor and a differential amplifier detecting the respective parallel channel power output and generating the respective parallel channel current signal. The second subtraction circuit inputs the first deviation signal and the error signal and generates the second deviation signal. The parallel converter channel further comprises a compensation circuit between the first subtraction circuit and the second subtraction circuit to filter and gain the signal. Additionally, the parallel converter channel can be turned on and turned off.

In another aspect, the invention provides a balanced current converter which comprises a converter output providing a power output and an average output voltage signal, an error amplifier comparing the reference voltage signal and the average output voltage signal to generate an error signal, and a plurality of converter channels in parallel coupled within the converter output and the error amplifier. Each of the plurality of converter channels comprises a pulse width modulator to adjust a respective power output of the converter channel. The converter may select one of the converter channels as a main converter channel with the highest respective power output of the converter channels, and select the other converter channels as a plurality of parallel converter channel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention discloses a balanced current converter with multiple pulse width modulated channels. The converter supplies a higher output current and simplifies and equally shares the current with every channel in different amounts of total current output.

Figure 1:
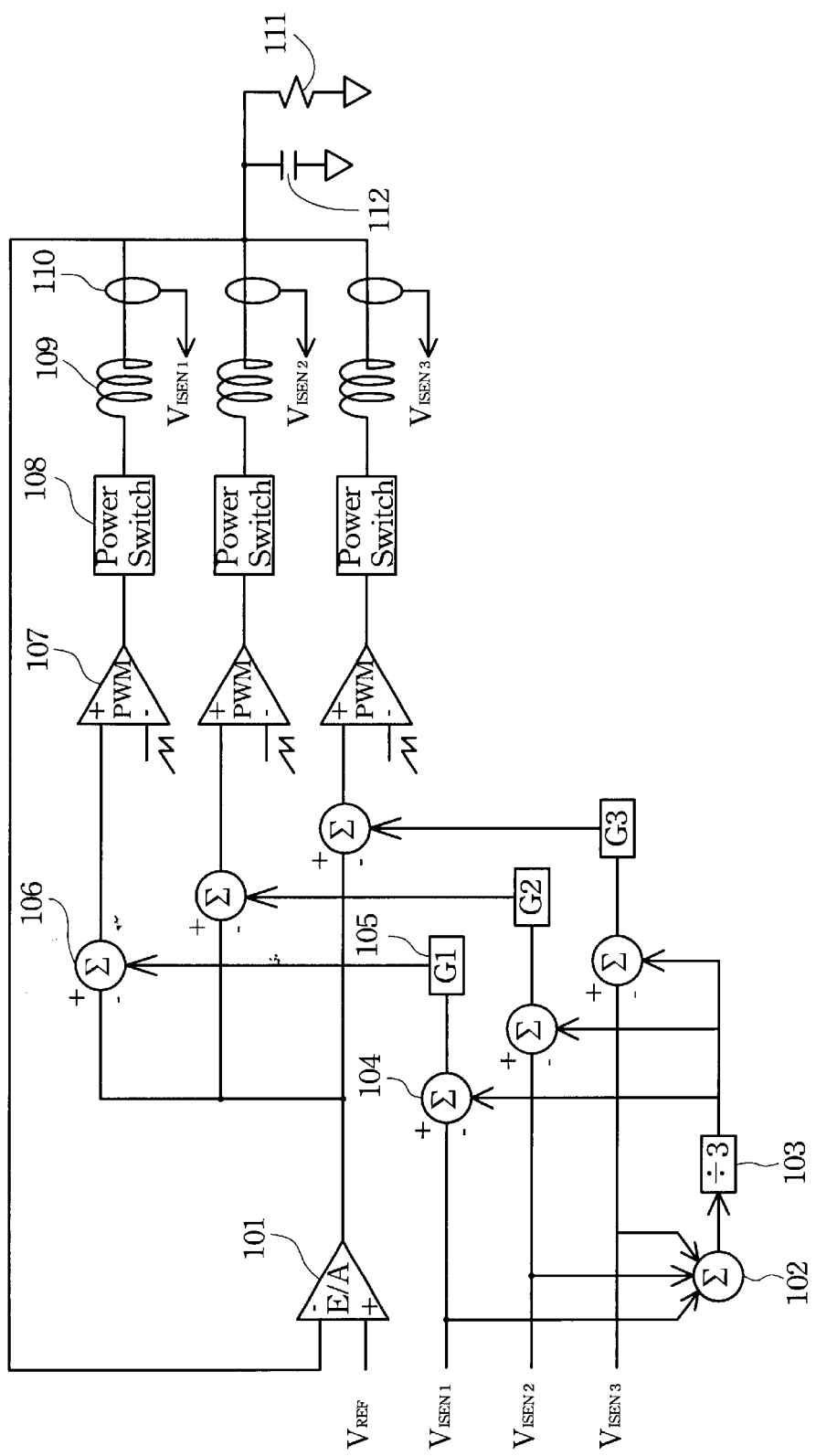
FIG. 1 is a circuit diagram of a converter with three PWM channels according to conventional art.
Figure 2:
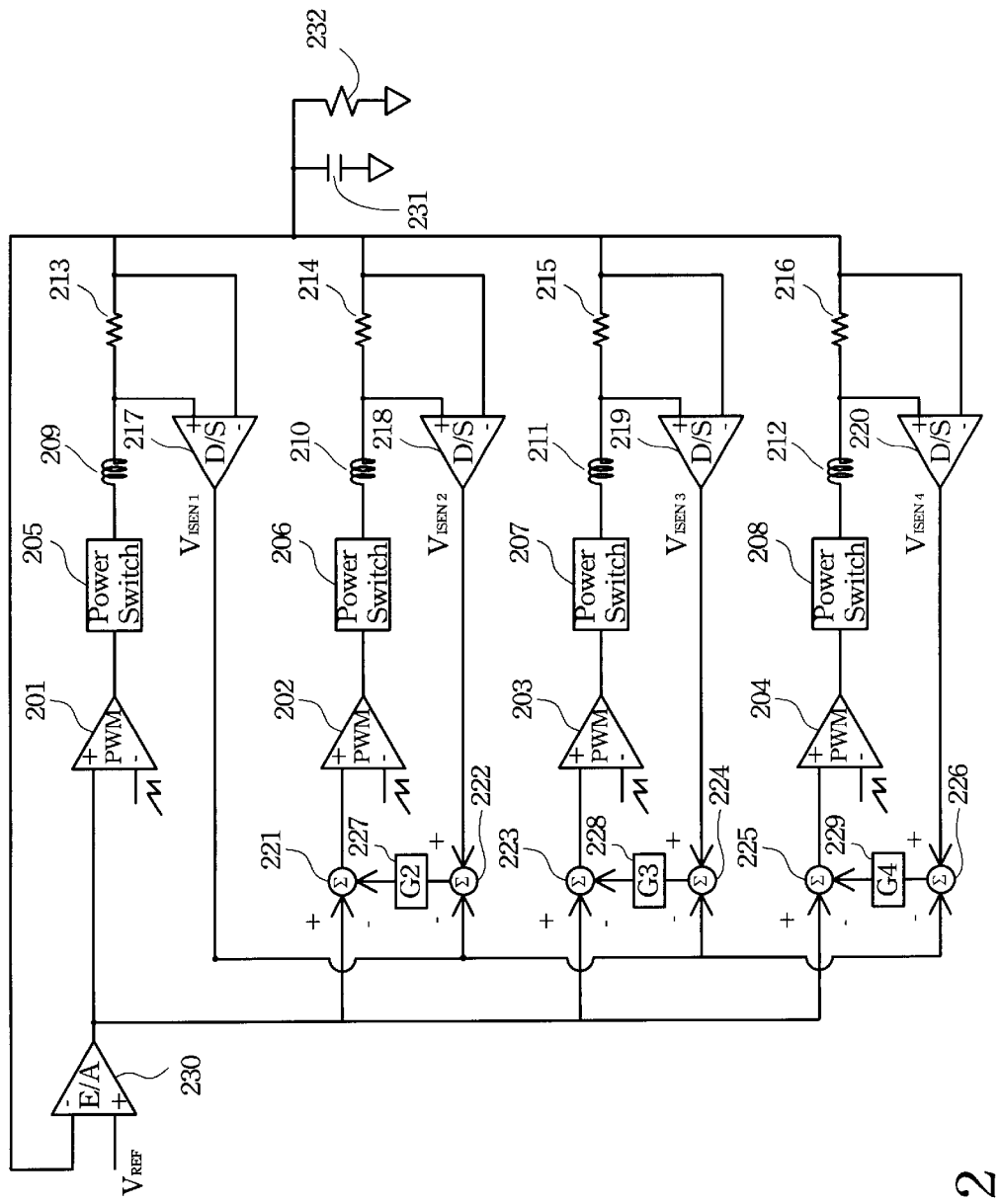
FIG. 2 is a circuit diagram of the converter with a plurality of PWM channels according to the present invention.

FIG. 2 is a circuit diagram of the converter with a plurality of PWM channels according to the present invention. As the drawing depicts, the preferred embodiment of the present invention includes a main converter channel, three parallel converter channels and an error amplifier 230. The main converter channel includes a pulse width modulator 201, a power switch 205, a filter, an inductor 209, a capacitor 231, a channel current sense circuit, a resistor 213 and a differential amplifier 217. Each parallel converter channel includes subtraction circuits 221 and 222, 223 and 224, 225 and 226; a compensation circuit 227, 228, 229; a pulse width modulator 202, 203, 204; a power switch 206, 207, 208; a filter including an inductor 210, 211, 212 and a capacitor 231; and a channel current sense circuit including a resistor 214, 215, 216 and a differential amplifier 218, 219, 220. The E/A 230 compares the $V_{REF}$ and the average output voltage of the converter and output the error signal, $V_{E/A}$. The $V_{REF}$ is a reference voltage of the converter and is proportional to the requirement of output voltage of the converter. The signal $V_{E/A}$ is an input of the main converter channel and the parallel converter channels. The parallel converter channels further comprise an input of the signal, $V_{1SEN1}$, which is proportional to the output current of the main converter channel. Therefore, the main converter channel adjusts the PWM duty cycle according to the error signal, $V_{E/A}$, and the parallel converter channels adjust the PWM duty cycle according to both the error signal, $V_{E/A}$ and the signal, $V_{1SEN1}$. That is to say, every parallel converter channel may adjust the output current to be the same as the output current of the main converter channel. The main converter channel and the parallel converter channels may adjust the output voltage according to the total output voltage. When the total output voltage is too high, the signal $V_{E/A}$ forces the converter channels to decrease the output voltage. When the total output voltage is too low, the signal $V_{E/A}$ forces the converter channels to increase the output voltage. Thus, all converter channels may stabilize their output voltage and balance their output current according to the load requirement.

Referring to the drawing, the E/A 230 compares the total output voltage signal and the $V_{REF}$, and then outputs the signal $V_{E/A}$. The main converter channel receives the signal $V_{E/A}$ as one input of the pulse width modulator 201; the other input of the pulse width modulator 201 is a ramp input from a ramp voltage source. The pulse width modulator 201 compares the two input signals and adjusts the duty cycle thereof to control the duty cycle of the power switch 205. Thereafter, the power switch 205 provides a pulse power output, and the filter circuit, the inductor 209 and the capacitor 231 filter the pulse power output to form a DC power output. The channel current sense circuit, the resistor 213 and the differential amplifier 217 sense the DC power output of the main converter channel and output the signal $V_{1SEN1}$ to the parallel converter channels as an input signal of the parallel converter channels. In practice, the channel current sense circuit may use a precision resistor or a turn-on resistor of the power switch 205, a MOSFET switch, and a differential amplifier 217 to measure the current of the channel. One of ordinary skill in the art will realize various other implementations and applications with which such an inventive stable voltage and balanced current converter may be employed.

The parallel converter channels receive the signal $V_{1SEN1}$, and then compare with the signals $V_{1SEN2}$, $V_{1SEN3}$ and $V_{1SEN4}$. These signals are proportional to the output currents of the parallel converter channels, respectively. For example, the subtraction circuit 222 subtracts the $V_{1SEN1}$ from $V_{1SEN2}$ and the subtraction circuit 222 obtains a deviation signal. The deviation signal goes through the compensation circuit 227, which performs current loop compensation functions, for example the gain or filter functions, to shape the current feedback wave, to achieve adequate current balancing, or to prevent current loop instability. The compensated signal arrives at the subtraction circuit 221 for comparison with the signal $V_{E/A}$. Hereafter, the pulse width modulator 202 adjusts the duty cycle thereof according to the comparative result of the subtraction circuit 221 and a ramp signal from a ramp voltage source. Thereafter, the power switch 206 outputs a pulse power, and the filter circuit, the inductor 210 and the capacitor 231 filter the pulse power to form a DC power output to the load 232. The channel current sense circuit, the resistor 213 and the differential amplifier 218 sense the DC power output of the parallel converter channel and feed back the signal $V_{1SEN2}$ to the subtraction circuit 222.

Therefore, the parallel converter channel may adjust the DC power output to fit the main converter channel. When the $V_{1SEN1} > V_{1SEN2}$, the parallel converter channel increases the output current, and when the $V_{1SEN1} < V_{1SEN2}$, the parallel converter channel reduces the output current. That is to say, all parallel converter channels will modify their output current to be the same as the output current of the main converter channel. In practice, the channel current sense circuit may use a precision resistor or a turn-on resistor of the power switch 206, a MOSFET switch, and a differential amplifier 218 to measure the current of the converter channel. Finally, all the converter channels will equally share the output current to the same output current of the main converter channel. And the E/A 230 may perform the function to adjust the total output voltage. When the average output voltage is lower than the $V_{REF}$, the total output voltage is increased and when the average output voltage is higher than the $V_{REF}$, the total output voltage is decreased. The present invention provides a converter with the balanced current output and the stable voltage output. In this manner, the present invention is able to provide the advantages and features described herein, as well as others that one ordinary skill in the art will realize given the inventive teachings herein.

The converter according to the present invention provides the stable voltage output and the balanced current output with a simple control circuit. Even if the user changes the working converter channels, turning off some parallel converter channels, the converter may adjust and share the total output current to the working channels equally and automatically. Because there is no complex correlation control signal need between the converter channels and no average current signal need for comparing the output current of the converter channels, the converter may easily change the working converter channels and reduce the total cost.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A balanced current converter with multiple pulse width modulated channels, the balanced current converter comprising:

a converter output providing a power output and an average output voltage signal;

an error amplifier inputting a reference voltage signal and the average output voltage signal, said error amplifier comparing the reference voltage signal and the average output voltage signal to generate an error signal;

a main converter channel coupled within the converter output and the error amplifier, the main converter channel outputting a main channel current signal and a main channel power output according to the error signal; and at least one parallel converter channel coupled within the converter output and the error amplifier, wherein the parallel converter channel further connects with the main converter channel to obtain the main channel current signal, the parallel converter channel compares the main channel current signal and a respective parallel channel current signal to generate a first deviation signal, the parallel converter channel compares the first deviation signal and the error signal to generate a second deviation signal, and the parallel converter channel provides a respective parallel channel power output and measures the respective parallel channel power output to feedback the respective parallel channel current signal, and wherein the power output includes the main channel power output and the respective parallel channel power output.

2. The converter according to claim 1, wherein the main converter channel further comprises:

a pulse width modulator inputting the error signal and outputting a pulse width modulated signal;

a power switch coupled with the pulse width modulator, the power switch inputting the pulse width modulated signal and outputting a pulse power based on the pulse width modulated signal;

a filter having an inductor and a capacitor, the filter coupled with the power switch and filtering said pulse power to generate the main channel power output; and a channel current sense circuit having a resistor and a differential amplifier, wherein the channel current sense circuit is coupled with the filter and the channel current sense circuit detects the main channel power output and generates the main channel current signal.

3. The converter according to claim 2, wherein the pulse width modulator further comprises a ramp signal input from a ramp voltage source.

4. The converter according to claim 2, wherein the channel current sense circuit further utilizes a turn-on resistor of the power switch to measure a voltage deviation between two ends of the turn-on resistor.

5. The converter according to claim 1, wherein the parallel converter channel further comprises:

a second subtraction circuit outputting the second deviation signal;

a pulse width modulator coupled with the second subtraction circuit, wherein said pulse width modulator inputs the second deviation signal and generates a pulse width modulated signal;

a power switch coupled with said pulse width modulator, wherein said power switch inputs the pulse width modulated signal and outputs a pulse power based on the pulse width modulated signal;

a filter having an inductor and a capacitor, said filter coupled with said power switch and filtering said pulse power to generate the respective parallel channel power output;

a first subtraction circuit coupled with the error amplifier and the main converter channel, the first subtraction circuit inputting the main channel current signal and the respective parallel channel current signal, wherein said subtraction circuit subtracts the main channel current signal from the respective parallel channel current signal and outputs the first deviation signal; and a channel current sense circuit having a resistor and a differential amplifier, the channel current sense circuit coupled with the filter, wherein the channel current sense circuit detecting the respective parallel channel power output and generates the respective parallel channel current signal;

wherein the second subtraction circuit inputs the first deviation signal and the error signal and generates the second deviation signal.

6. The converter according to claim 5, wherein the pulse width modulator further comprises a ramp signal input from a ramp voltage source.

7. The converter according to claim 1, wherein the channel current sense circuit utilizes a turn-on resistor of the power switch to measure a voltage deviation between two ends of the turn-on resistor.

8. The converter according to claim 5, wherein the parallel converter channel further comprises a compensation circuit between the first subtraction circuit and the second subtraction circuit to perform current loop compensation functions.

9. The converter according to claim 1, wherein the reference voltage signal is proportional to an output need of the converter.

10. The converter according to claim 1, wherein the parallel converter channel has a capability of turning on and turning off.

11. A balanced current converter with multiple pulse width modulated channels, the converter comprising:

a converter output providing a power output and an average output voltage signal;

an error amplifier inputting a reference voltage signal and the average output voltage signal, wherein said error amplifier compares the reference voltage signal and the average output voltage signal to generate an error signal;

a main converter channel coupled within the converter output and the error amplifier, the main converter channel outputting a main channel current signal and a main channel power output according to the error signal, wherein the main converter channel further comprises:

a main channel pulse width modulator inputting the error signal and outputting a main channel pulse width modulated signal, a main channel power switch coupled with the main channel pulse width modulator, the main channel power switch inputting the main channel pulse width modulated signal and outputting a main pulse power based on the main channel pulse width modulated signal, a main channel filter having a main channel inductor and a main channel capacitor, the main channel filter coupled with the main channel power switch and filtering said main pulse power to generate the main channel power output, and a main channel current sense circuit having a main channel resistor and a main channel differential amplifier, the main channel current sense circuit coupled with the main channel filter, wherein the main channel current sense circuit detects the main channel power output and generates the main channel current signal; and at least one parallel converter channel coupled within the converter output and the error amplifier, wherein the parallel converter channel further connects with the main converter channel to obtain the main channel current signal, the parallel converter channel compares the main channel current signal and a respective parallel channel current signal to generate a first deviation signal, the parallel converter channel compares the first deviation signal and the error signal to generate a second deviation signal, and the parallel converter channel provides a respective parallel channel power output and measures the respective parallel channel power output to feedback the respective parallel channel current signal, the parallel converter channel further comprising:

a second subtraction circuit outputting the second deviation signal, a parallel channel pulse width modulator coupled with the second subtraction circuit, wherein said parallel channel pulse width modulator inputs the second deviation signal and generates a parallel channel pulse width modulated signal, a parallel channel power switch coupled with said parallel channel pulse width modulator, wherein said parallel channel power switch inputs the parallel channel pulse width modulated signal and outputs a parallel pulse power based on the parallel channel pulse width modulated signal, a parallel channel filter having a parallel channel inductor and a parallel channel capacitor, wherein said parallel channel filter is coupled with said parallel channel power switch and filters said parallel pulse power to generate the respective parallel channel power output, a first subtraction circuit coupled with the error amplifier and the main converter channel, the first subtraction circuit inputting the main channel current signal and the respective parallel channel current signal, wherein said subtraction circuit subtracts the main channel current signal from the respective parallel channel current signal and outputs the first deviation signal; and a parallel channel current sense circuit having a parallel channel resistor and a parallel channel differential amplifier, the parallel channel current sense circuit coupled with the parallel channel filter, wherein the parallel channel current sense circuit detects the respective parallel channel power output and generates the respective parallel channel current signal;

wherein the second subtraction circuit inputs the first deviation signal and the error signal and outputs the second deviation signal, and the power output includes the main channel power output and the respective parallel channel power output.

12. The converter according to claim 11, wherein the reference voltage signal is proportional to an output need of the converter.

13. The converter according to claim 11, wherein the main channel pulse width modulator further comprises a ramp signal input from a ramp voltage source.

14. The converter according to claim 11, wherein the parallel channel pulse width modulator further comprises a ramp signal input from a ramp voltage source.

15. The converter according to claim 11, wherein the main channel current sense circuit further utilizes a turn-on resistor of the main channel power switch to measure a voltage deviation between two ends of the turn-on resistor.

16. The converter according to claim 11, wherein the parallel channel current sense circuit further utilizes a turn-on resistor of the parallel channel power switch to measure a voltage deviation between two ends of the turn-on resistor.

17. The converter according to claim 11, wherein the converter comprises a single-phase converter.

18. The converter according to claim 11, wherein the converter comprises a multi-phase converter.

19. The converter according to claim 11, wherein the parallel converter channel has a capability of turning on and turning off.

* * * * *